United States Patent [19]

Hegel, Jr. et al.

[11] Patent Number: 4,752,694
[45] Date of Patent: Jun. 21, 1988

[54] ARRAY UNIFORMITY CORRECTION

[75] Inventors: Rudolph R. Hegel, Jr., Richfield; R. Andrew Wood, Bloomington, both of Minn.

[73] Assignee: Honeywell Inc., Minneapolis, Minn.

[21] Appl. No.: 2,324

[22] Filed: Jan. 12, 1987

[51] Int. Cl.[4] ............................................. G01K 17/20
[52] U.S. Cl. ............................. 250/578; 358/213.15; 374/32; 374/128
[58] Field of Search ........... 250/578; 358/212, 213.11, 358/213.15, 213.17, 213.31; 357/30 H, 24 LR, 29, 32; 374/128, 32

[56] References Cited

U.S. PATENT DOCUMENTS

| 3,562,418 | 2/1971 | Glusick et al. | |
|---|---|---|---|
| 3,668,408 | 6/1972 | Yamashita et al. | |
| 3,676,590 | 7/1972 | Weimer | |
| 3,801,949 | 4/1974 | Larrabee | |
| 4,298,887 | 11/1981 | Rode | 358/213.15 |
| 4,459,488 | 7/1984 | Uzawa et al. | 250/578 |
| 4,472,239 | 9/1984 | Johnson et al. | |
| 4,633,314 | 12/1986 | Kurata et al. | 358/213.15 |
| 4,654,816 | 3/1987 | Arques et al. | 358/213.31 |

Primary Examiner—Edward P. Westin
Attorney, Agent, or Firm—Omund R. Dahle

[57] ABSTRACT

A two-dimensional bolometer array having electronic array uniformity correction. The individual resistive sensors in the bolometer array are not electrically uniform and uniformity is a requirement to permit efficient electrical readout of signals. An electronic correction circuit in this invention automatically corrects for non-uniformity in the array.

9 Claims, 3 Drawing Sheets

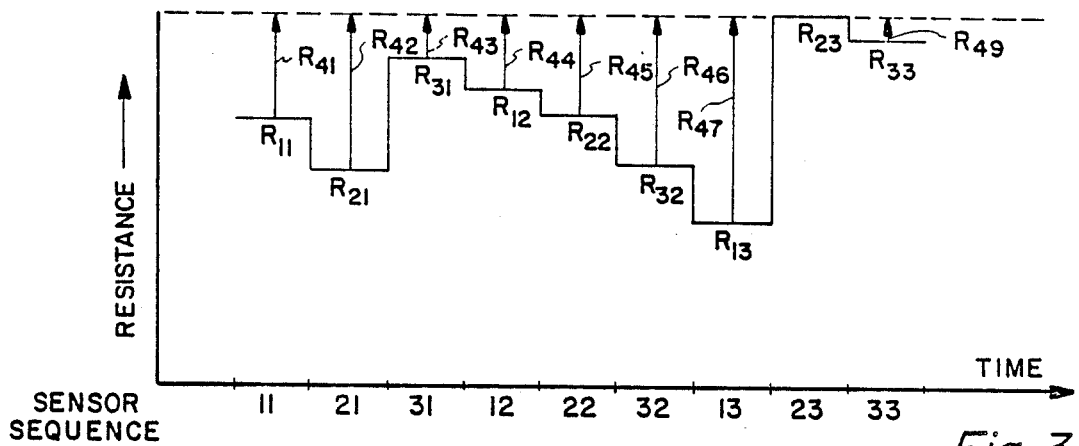
Fig. 3
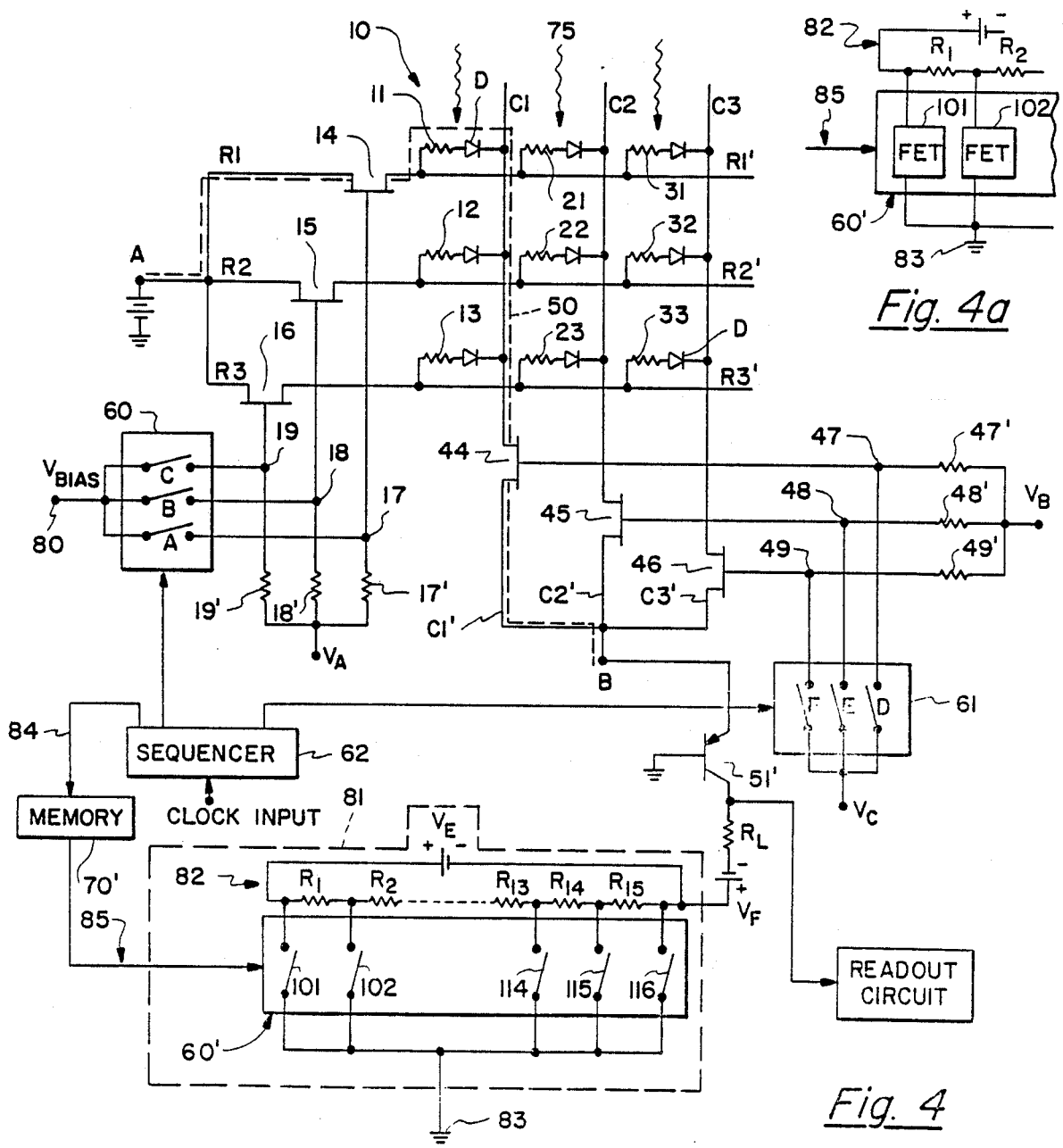
Fig. 4a
Fig. 4

4,752,694

ARRAY UNIFORMITY CORRECTION

ARRAY UNIFORMITY CORRECTION

The U.S. Government has certain rights in this invention pursuant to the terms of a contract DAAL01-85-C-0153.

BACKGROUND AND SUMMARY OF THE INVENTION

The field of the invention is two-dimensional bolometer arrays, and particularly to non-uniformity correction thereof.

Two-dimensional arrays of bolometers require high electrical uniformity to permit efficient electrical readout of signals. Non-uniformities may be due to fabrication irregularities in any part of the array, eg. in the sensors themselves, in any blocking diodes in the array, or in the bus lines. High uniformity is difficult to attain during manufacture. This invention allows high uniformity to be attained by an electronic correction circuit, which automatically corrects for non-uniformity in the array. Two types of circuits are shown, with different merits. In the pior art such as U.S. Pat. Nos. 3,562,418, 3,668,408 and 3,676,590 are shown two-dimensional matrix arrays of photoresponsive elements.

A two-dimensional bolometer array such as is used in the present invention is made up of a number of resistive thermal detectors. A resistive thermal detector is one whose electrical resistance changes as a function of temperature. Such two-dimensional arrays are known.

In the prior art, such as U.S. Pat. No. 3,801,949 there has been taught a radiation detecting solidstate imaging device which is small in size and which has a two-dimensional array of thermal detectors in an integrated microcircuit. The detector array is fabricated on a single crystal silicon substrate coated with a thin layer of electrical insulating material, such as silicon dioxide or silicon nitride. Etched openings are made in the silicon beneath the insulating layer wherever a sensing element is desired for the purpose of thermally isolating the sensing elements from their surroundings.

Another prior art example of thermal sensors on the crystalline structure of a single crystal semiconductor is the Johnson and Higashi U.S. Pat. No. 4,472,239, assigned to the same assignee as the present invention. The referenced patents shows that the technique is known to manufacture micromechanical devices by etching into single crystal silicon. The citation of these two patents is provided merely as background and is not deemed as prior art to the specific invention claimed in this application.

BRIEF DESCRIPTION OF THE DRAWINGS

FIG. 3 is a graphical showing of the individual resistance of the sensors in the 3×3 array.

FIGS. 4 (and 4a) is an alternate embodiment to FIG. 1 and is shown in schematic diagram form.

DESCRIPTION

Figure 1:
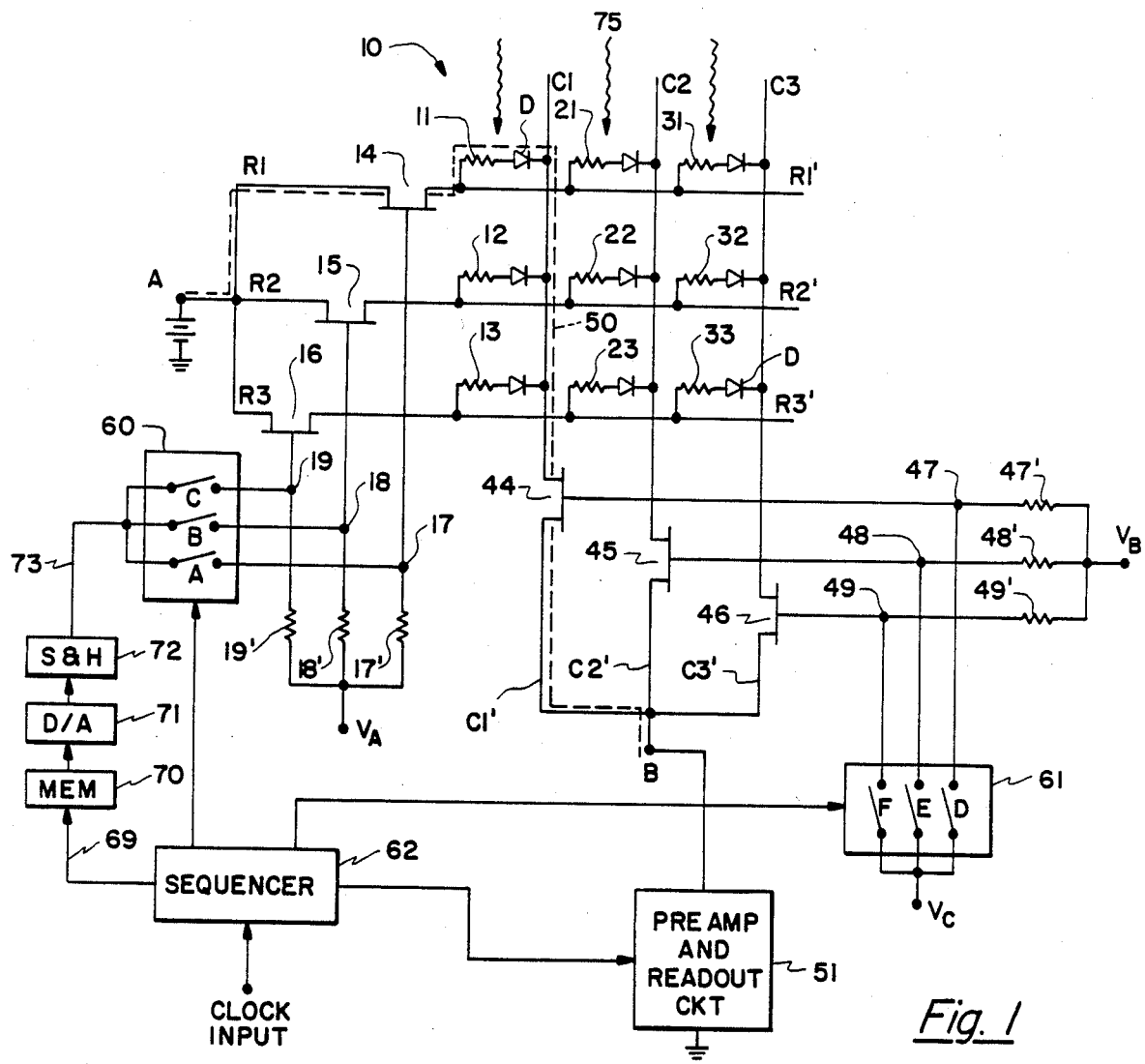
FIG. 1 is a schematic representation of an embodiment of the invention.

FIG. 1 schematically shows a 3×3 array 10 of resistive sensors with associated blocking diodes. Each sensor may be connected to a readout circuit via points A and B by closing selected contacts of switches 60 and 61. These switches apply control signals to the FETs connected to each row and column of the array, enabling any FET to be switched to a low-impedance "ON" state.

Thus there is shown resistive sensors 11, 12, 13, 21, 22, 23, 31, 32 and 33 each having in series therewith a current blocking diode D. Array 10 has shown three rows of conductors R1', R2' and R3' and three columns of conductors C1, C2 and C3 for explanatory purposes. The 3×3 array is exemplary and any desired size array can be used. In series with conductor R1 is the output circuit of a FET 14. Gate electrode of FET 14 is connected by a conductor 17 and resistor 17' to a bias voltage supply $V_A$. Likewise FET 15 is connected by conductor 18 and resistor 18' to $V_A$ and FET 16 is connected by a conductor 19 and resistor 19' to $V_A$. The potential of $V_A$ is effective to bias the FETs 14, 15 and 16 to a non-conductive state.

In series with conductor C1 is the output circuit of a FET 44. Gate electrode of FET 44 is connected by a conductor 47 and a resistor 47' to a bias voltage supply $V_B$. Likewise FET 45 is connected by conductor 48 and resistor 48' to $V_B$ and FET 46 is connected by a conductor 49 and resistor 49' to $V_B$. The bias potential $V_B$ is effective to bias the FETs 44, 45 and 46 to a non-conductive state. The FETs 14, 15 and 16 and also 44, 45 and 46 need to be biased "on" in a proper sequence to measure the resistance of the array of sensors. The dotted line 50 shows a sample current path for the sensor 11 starting from terminal A through conductor R1, FET 14, sensor 11 and diode D, conductor C1, FET 44, terminal B and readout circuit 51. Each of the sensors shown may be connected to the preamplifier and readout circuit 51 via terminals A and B by selectively closing contacts of switches 60 and 61. Switch 60 has independently operable contacts A, B and C and switch 61 has independently operable contacts D, E and F. These switches apply control signals to the FETs connected to each row and column of the array, enabling any FET to be switched to a low-impedance "ON" state. In the current path shown by dashed line 50, switch contacts 60A and 61D are closed to bias on FETs 14 and 44. The switches 60 and 61 are schematically shown in FIG. 1 as mechanical contacts, however, these switches may be electronic switches controlled by a sequencer 62. The sequencing signal to switch 61 may run at three times the rate of the sequencing signal to switch 60, for example. Sequencer 62 provides all the signals necessary to synchronize the operation of memory 70, switch 60 and 61, and the readout circuit 51.

The switching potential $V_C$ applied through switch contacts 61D, E or F to FETs 44, 45 and 46 respectively, is sufficient to switch these FEs full on. In the case of FETs 14, 15 and 16, however, the situation is somewhat different. Rather than switch these FETs 14, 15 and 16 full on in their proper sequence, it is designed to selectively control the on-resistance of the FET depending on the sensor being energized. The control signal fed to the FET gates is derived from the digital memory 70, labeled MEM, via a digital-to-analog converter 71 labeled D/A, a sample-and-hold 72, a conductor 73 and switch 60. The digital data stored in the memory consists of numbers which, when converted to a control voltage and applied to the JFET gate, controls the precise ON-resistance of a FET so that the effective impedance between A and B is always the same whatever sensor is selected. A different number is stored in the memory for each array sensor; and is withdrawn from memory when that sensor is required to be readout. Typically the control signals applied to a FET change the FET ON-resistance by about 0.5 ohm per millivolt applied to the gate. Thus an array non-uniformity of about 500 ohms can be corrected with control signals of up to about 1000 millivolts applied to the FET gates as shown graphically in FIG. 2.

FIG. 3 shows in graphical form an example of the varying resistances of the several sensors 11, 21, 31, 12, 22, 32, 13, 23 and 33 when they are measured under like conditions. During this initial measurement of the sensors, the FETs 14, 15 and 16 are also biased full on in proper sequence together with FETs 44, 45 and 56. In this example curve, the sensor 23 has the highest resistance $R_{23}$. It is desirable to add enough series resistance to each of the other sensors by way of the FET 14, 15 or 16 to bring the totol series resistance of each sensor up to that of $R_{23}$.

Figure 2:
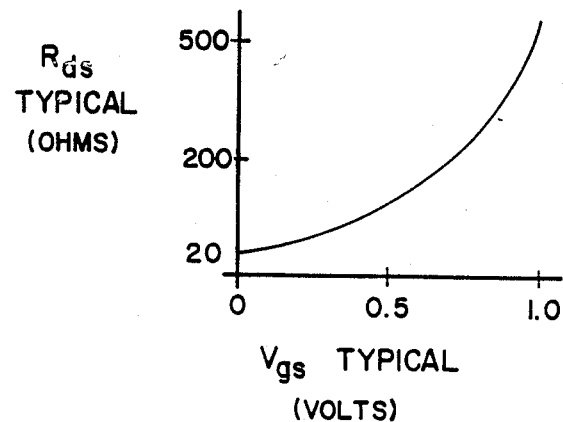
FIG. 2 is a graphical plot of the resistance $R_{ds}$ of a FET versus $V_{gs}$ typical in volts.

This series resistance to be added is shown in FIG. 3 by the vertical arrows $R_{41}$–$R_{49}$ above the resistance of each sensor. In order to add the proper resistance the graph presentation of FIG. 2 is helpful in which bias applied to the FET is plotted vs. resistance $R_{ds}$. Thus for instance, from FIG. 3, for the sensor 11 which has a measured resistance of $R_{11}$, there must be added a resistance $R_{41}$ in the impedance of FET 14. Thus the control signal fed to the FET gate must be of the voltage to make the drain to source resistance equal to $R_{41}$. In other words, the digital data number stored in memory 70 for location sensor 11 must convert to a potential in D/A converter 71 so that closed contact 60A of switch 60 connects the voltage to the gate of FET 14 which results in an impedance $R_{ds}$ from drain to source. As the sequencer 62 cycles to each subsequent sensor, the memory 70 produces the right number to bias the FET 14, 15 or 16 to the correct impedance for that sensor. In this way the effects of the non-uniformities of the several sensors is electronically minimized, and in the absence of external radiation to the sensors, the readout circuit will see the same output for each sensor. In operation, a radiation image 75 is falling on the two-dimensional array 10 and the temperature responsive sensors 11 etc. in the array are each being heated according to the radiation image. The synchronization circuit 69 is maintaining the sequencer 62, the memory circuit 70, and the read-out circuit 51 in sync so that the readout circuit receives information which is a true function of the radiation image, the nonlinearities of the sensors having been eliminated, in effect.

ALTERNATE EMBODIMENTS

The embodiment of FIG. 1 described above uses an offset correction signal applied to the FETs 14, 15, and 16 surrounding the array. An advantage of this embodiment is that the array non-uniformity is corrected directly at the array (so the preamplifier 51 does not have to accomodate a large dynamic range) and very large non-uniformities can be corrected. A disadvantage is that the signal levels at the array are at their smallest, and the noise and stability requirement on circuits are most stringent.

Figure 5:
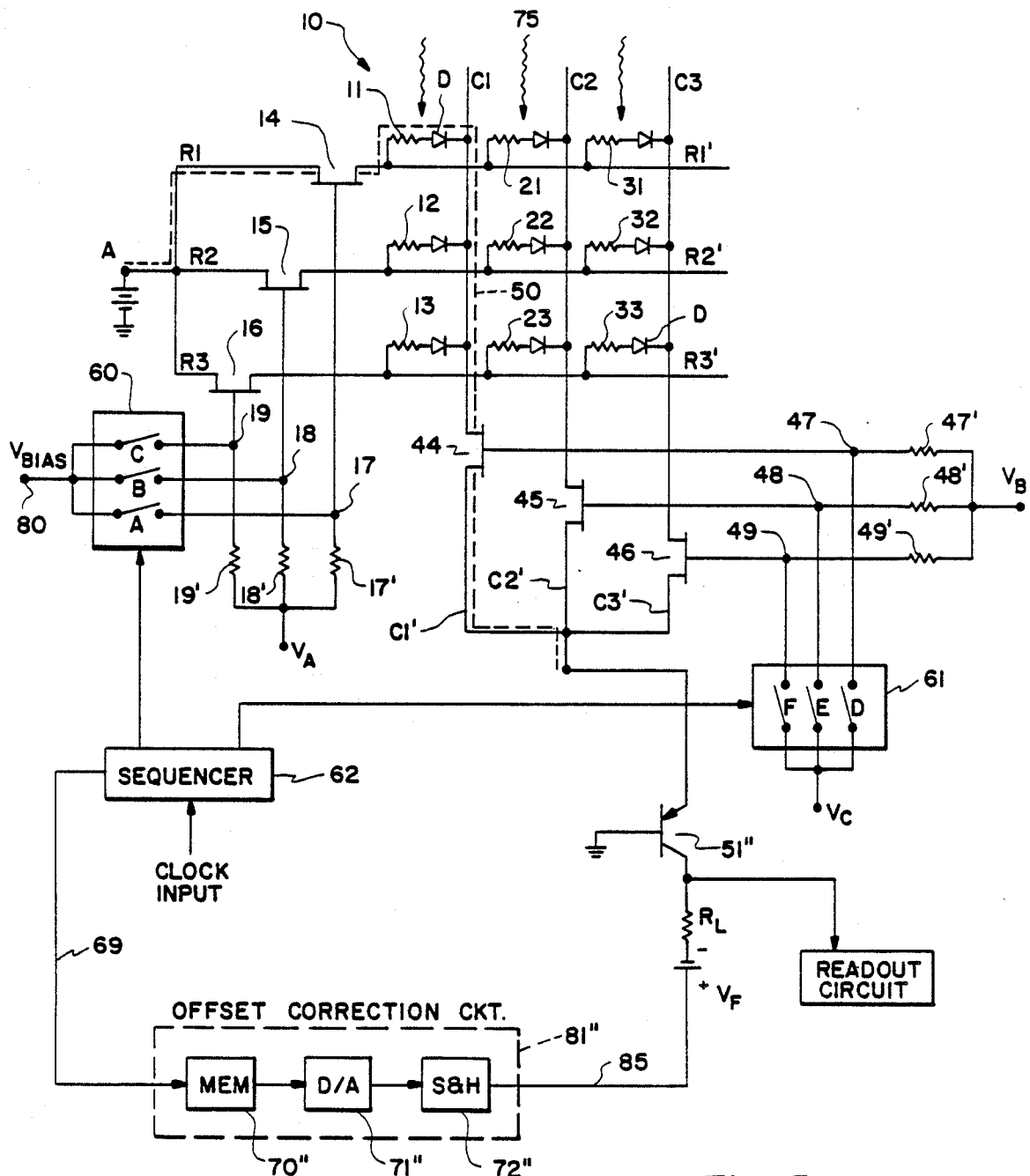
FIG. 5 is another alternate embodiment and is shown in schematic diagram form.

FIGS. 4 and 5 show alternate preferred embodiments from that described in FIG. 1. Many of the components are the same, however, and the same identifying numbers are used throughout wherever possible. Referring now to the embodiment of FIG. 4 it will be seen that remaining unchanged is the array of resistive sensors 10, the rows and columns, the FETs, and the switches 60 and 61. One immediately apparent difference is that a constant voltage control signal 80 is selectively applied to FETs 14, 15 and 16 through switch 60. The control potential 80 is effective to switch any of FETs 14, 15 and 16 to a low impedance "ON" state, that is, full-on. In the previous embodiment, in contrast, these FETs were operated as controlled resistance members. In FIG. 4 the offset correction circuit 81 provides an alternate correction means and this circuit 81 is connected to provide a selected offset correction voltage which is applied at the output of preamplifier 51'. In FIG. 4 there is shown in the offset correction circuit 81 a voltage divider 81 comprising a potential source $V_E$ and a plurality of series connected resistor elements $R_1$–$R_{15}$. Switch 60' comprises a plurality of switches 101 through 116, all normally OFF, selectively connect any one of 16 points along the resistive divider to ground potential 83, depending on which switch is turned on. The plurality of switches 101 through 116 may comprise in part a plurality of field effect transistors (FETs), see FIG. 4a. This provides for a selection from 16 different offset correction voltages to be added to the preamp supply $V_F$. Thus a circuit can be traced from the 3×3 array 10 output at B through preamplifier transistor 51', a load resistor $R_L$, a potential source $V_F$, voltage divider network 82 and through a selected one of switches 101–116 to ground. A conductor 84 from the ooutput of sequencer 62 is connected by way of memory 70', and further conductor 85 in controlling the switch 60' so that the proper corrective bias is added to preamp 51' as each array matrix pixel is being interrogated. Nonuniformity in the signal levels from the array are therefore corrected at the output of the preamplifier.

Referring now to FIG. 5 there is shown another embodiment which is currently a preferred embodiment. Similar to FIG. 4 it will be seen that remaining unchanged is the array of resistive sensors 10, the rows and columns, the FETs, and the switches 60 and 61. As in FIG. 4, a constant voltage control signal 80 is selectively applied to FETs 14, 15 and 16 through switch 60. This control potential 80 is effective to switch any of FETs 14, 15 and 16 to a low impedance "ON" state, that is, full-on.

Also similar to FIG. 1, there is shown in FIG. 5 an offset correction circuit 81" which includes a digital memory 70", labeled MEM, a digital-to-analog converter 71", labeled D/A, and a sample-an-hold 72", labeled S&H. This offset correction circuit has digital data stored in the memory 70" which consists of numbers which when converted to a voltage by means of the D/A 71" and the S&H 72" is applied at conductor 85 to the output of preamp 51" so that the proper corrective bias is addd to preamp 51" as each array pixel is being interrogated. Nonuniformity in the signal levels from the array are therefore corrected at the output of the preamplifier. Thus in FIG. 5 the correction signals applied to the output of the preamplifier are obtained from a sample-and-hold unit rather than from a potential divider (as in FIG. 4). This allows a large number of correction voltages to be selected and applied, e.g., use of a 16-bit memory and D/A will allow 65,536 correction voltages. To obtain this many correction voltages using the arrangement of FIG. 4 we would need 65,536 individual switches. At the present time there are some limitations to the circuit of FIG. 5 in that there is a tendency for D/A and S&H chips to be more noisy and less stable than the simple arrangement shown in FIG. 4.

The embodiments of the invention in which an exclusive property or right is claimed are defined as follows:

1. A circuit for providing array uniformity correction, comprising in combination:

a plurality of resistance type radiation sensor means connected in an array, each of said sensor means having an inherent electrical resistance associated therewith, the ohm magnitude of which may differ from sensor to sensor;

switching means for sequentially connecting said sensor means, one at a time, to an electrical source and to a readout circuit for interrogation of said sensor means, said switching means including controllable resistance means in series with the sensor means;

digital memory means storing a separate number for each of said sensor means, which numbers are a function of the inherent resistance value, respectively, of each sensor means; said memory means also providing an output of the number representing the sensor means under interrogation; and, digital-to-analog converting means connected for converting the number output of said memory means to an analog voltage and applying the analog voltage in controlling biasing relation to the controllable resistance means.

2. The circuit according to claim 1 in which each of said sensor means further includes diode means in series therewith.

3. The circuit according to claim 1 in which said switching means comprises a plurality of field effect transistors each of which is biased to a non-conductive quiescent state, and any two of which can be selectively biased to a conductive state to connect a selected corresponding sensor means for said interrogation.

4. The circuit according to claim 1 in which said controllable resistor means comprises field effect transistors.

5. A circuit for providing array uniformity correction, comprising in combination:

a plurality of resistance type radiation sensor means connected in a twodimensional x-y array, each of said sensor means having an inherent electrical resistance associated therewith, the ohm magnitude of which may differ from sensor to sensor;

switching means for sequentially connecting said sensor means, one at a time, to an electrical source and to a preamplifier and readout circuit for interrogation of said sensor means;

digital memory means storing an individual number for each of said sensor means, which numbers are a function of the inherent resistance value, respectively, of each sensor means; said memory means also providing an output of the number representing the sensor means under interrogation;

sequencer means connected to said switching means and to said memory means for synchronizing said switching means and said memory means to the sensor being interrogated; and offset correction circuit means comprising a multipotential source connected to supply a controlled potential to said preamplifier to thereby adjust the output signal from said preamplifier to said readout circuit, said multipotential source being connected to and controlled by said memory means output.

6. The circuit according to claim 5 in which each of said sensor means further includes diode means in series therewith.

7. The circuit according to claim 5 in which said switching means comprises a plurality of field effect transistors each of which is biased to a non-conductive quiescent state, and any two of which can be selectively biased to a conductive state to connect a selected corresponding sensor means for said interrogation.

8. The circuit according to claim 5 in which said multipotential source comprises a multisection resistive voltage divider network having nodes between resistive sections and a plurality of switching means selectively connecting said nodes to a reference potential in response to a signal from said memory means.

9. The circuit according to claim 8 in which said plurality of switching means comprises in part a plurality of field effect transistors.

* * * * *